Aug. 14, 1951 J. P. WATSON 2,563,983
GYROSCOPIC INSTRUMENT
Filed April 5, 1949 2 Sheets-Sheet 1
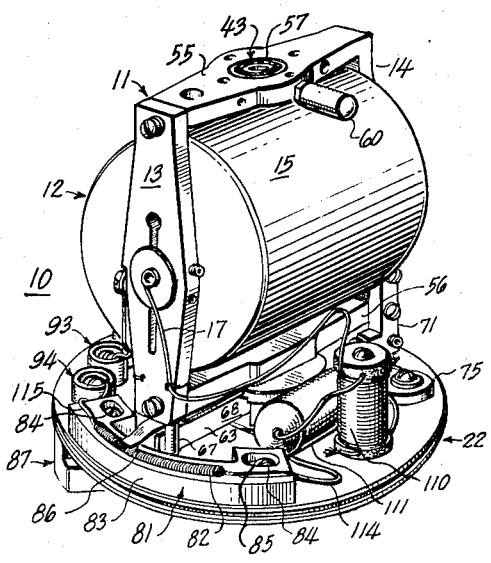
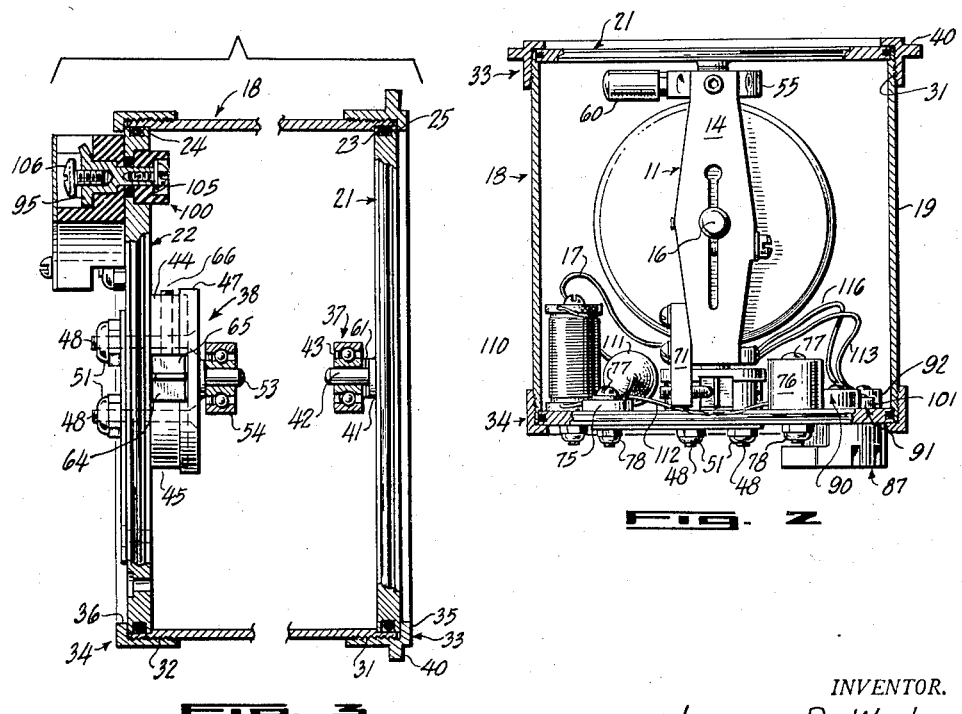
INVENTOR.
James P. Watson
BY
Walter J. Jason
ATTORNEY Aug. 14, 1951 J. P. WATSON 2,563,983
GYROSCOPIC INSTRUMENT
Filed April 5, 1949 2 Sheets-Sheet 2
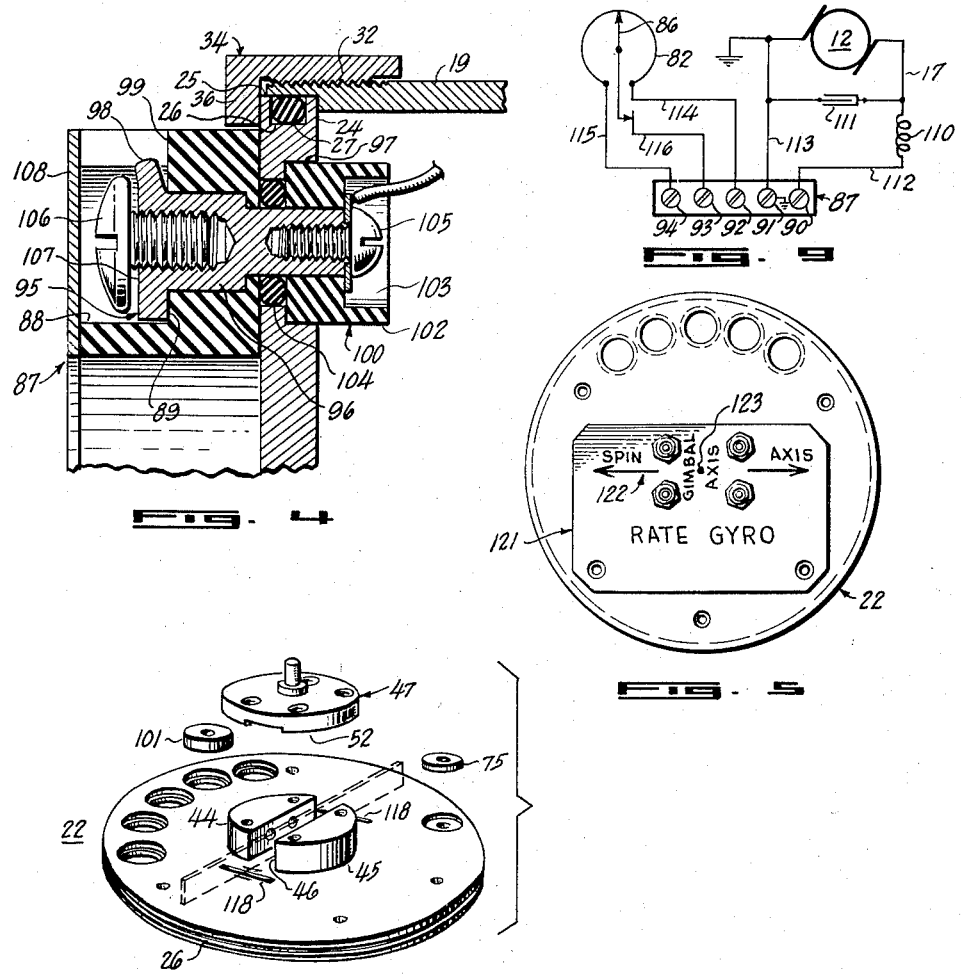
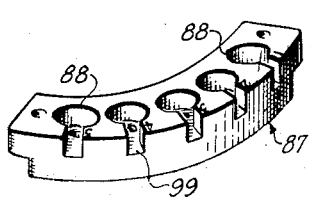
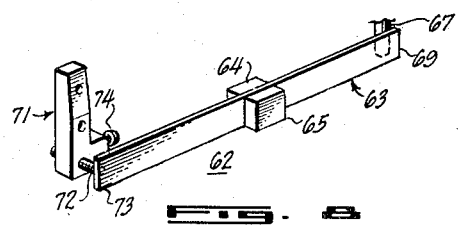
INVENTOR.
James P. Watson
BY
ATTORNEY Patented Aug. 14, 1951

2,563,983

UNITED STATES PATENT OFFICE 2,563,983

GYROSCOPIC INSTRUMENT

James P. Watson, San Diego, Calif., assignor to Paul E. Humphrey, San Diego, Calif.

Application April 5, 1949, Serial No. 85,489

14 Claims. (Cl. 74—5.4)

This invention relates to gyroscopic instruments and more particularly to improvements in angular rate indicating gyroscopic devices.

One of the objects of the present invention is to provide an improved angular rate indicating gyroscopic device embodying a novel manner of mounting the gyroscope gimbal and of resiliently restraining movement of the same.

Another object of this invention resides in the provision of a single degree of freedom gyroscopic device having a spring restrained gimbal and a position sensing element in operative association for measuring, linearly, the rate of turn of the apparatus upon which the gyroscope is mounted.

Another object lies in providing a novel gyroscopic device of the above character having an improved arrangement of components wherein these components when assembled will be accurately located relative to one another, and which accurate relationship is readily attained and maintained.

Another object of the invention is the provision of an improved construction for securing complete hermetic sealing of an angular rate indicating gyroscope device within its housing.

A further object is to provide a novel construction for the gyroscopic device of the above character wherein the housing for the instrument serves as a stationary supporting structure for maintaining the bearings of the gyroscope's gimbal in alignment.

A still further object is the provision of a housing of the character indicated adapted to support upon its base the assembled components of the gyroscopic device.

Still another object resides in providing a construction for the angular rate indicating gyroscopic device permitting a reduction in the size, weight, and number of components, but retaining durability and ease and inexpensiveness of manufacture, and resulting in a device which operates in effective and efficient manner.

Other objects and features of the present invention will be readily apparent to those skilled in the art from the following specification and appended drawings wherein is illustrated a preferred form of the invention, and in which:

Figure 1 is a perspective view of a gyroscope embodying the invention.

Figure 2 is a side view partially in section, of the gyroscope contained in its housing.

Figure 3 is an enlarged partial view in section of the housing principally illustrating the gimbal bearing supports.

Figure 4 is another enlarged partial view, which view illustrates the terminal assembly employed and sealing details.

Figure 5 is an end view of the base of the housing having a plate secured thereto on which intelligence appears for determining the location within the housing of the principal axes of the gyroscope.

Figure 6 is a perspective view of the base showing details of a support for the gimbal.

Figure 7 is a perspective view of the terminal block.

Figure 8 is a view in perspective of the spring restraining means provided for the gimbal; and Figure 9 illustrates the wiring diagram for the circuit employed by the gyroscope.

Referring now with greater particularity to the drawings, the present invention is shown as embodying a gyroscopic instrument indicated generally by the numeral 10 which comprises a generally rectangular gimbal frame 11 and gyro rotor 12 of the electric motor type supported between upwardly extending arms 13 and 14 of gimbal frame 11. Gyro rotor 12 is of conventional construction comprising a casing or frame 15 which is rotatably supported by suitable bearings (not shown) on a through shaft 16 the ends of which are fixedly mounted in any conventional manner to the spaced gimbal arms 13 and 14. The gyro rotor 12 may be spun about its spin axis by means of a suitable conventional motor (not shown) contained within casing 15, which motor includes a permanent magnet field (not shown) affixed to shaft 16 and an armature and windings assembly (not shown) mounted in suitable manner upon the interior wall of the casing 15 in surrounding relationship to the field. Electrical power from a suitable soure (not shown) is supplied to the motor through a lead 17 suitably electrically connected through shaft 16 to the motor windings for effecting rotation of the armature about the stator; this rotative movement of the armature obviously results in rotative movement of casing 15 because it carries the armature, about its supporting shaft 16.

It is apparent that the spin axis of gyro rotor 12 coincides with the axis of shaft 16. This spin axis is furthermore perpendicular to the axis of gimbal frame 11. A housing 18 is provided for enclosing the gyroscopic instrument 10, which housing 18 comprises a cylindrical metallic casing 19, an annular metallic cover plate 21 closely received within one end of the casing 19 for closing this end of the casing and an annular metallic base member 22 snugly fitted into the opposite end of casing 19 for closing this latter end. It is understood that materials other than metal could be utilized in the manufacture of the housing. Each end of casing 19 is counter-bored to provide annular shoulders 23 and 24. Cover plate 21 is adapted to rest upon shoulder 23 and base member 22 will abut shoulder 24. It is to be noted that the depth of the two counter bores has been limited so that each is less than the height of the cover plate 21 and base member 22. This results in a portion 25 of each of these members projecting a slight distance beyond the rims of the cylindrical casing 19 for a purpose to be described. The cover plate 21 and the base member 22 each has an annular, generally square in cross-section, groove 26 cut into its periphery. Within each of these grooves 26 is fitted an annular resilient sealing ring 27. These sealing rings 27 are adapted to be compressed between the interior wall of the casing 19 and the defining walls of the grooves 26 to provide an effective seal at both ends of the casing 19. As shown in the drawings the casing 19 is externally threaded at each of its ends, as indicated at 31 and 32. Upon these threaded end portions 31 and 32 are fitted ring members 33 and 34 which act on cover plate 21 and base member 22 to maintain them on casing 19. Ring member 33 is provided with an inwardly directed flange 35 which is adapted to engage the projecting portion 25 of cover plate 21 to apply a clamping pressure to the cover plate 21 to effect a tight engagement with shoulder 23. Ring member 34 is similarly provided with an inwardly directed flange 36 which acts in like manner to engage projecting portion 25 of base member 22 to clamp this member tightly against its associated shoulder 24. This manner of mounting the cover plate 21 and the base member 22 to the casing 19 prevents relative movement between these named elements and results in an effectively rigid construction. As shown the ring member 33 is provided with a second flange 40, outwardly extending from the periphery thereof. This flange 40 is afforded to assist in mounting the device 10 upon an apparatus. It is understood that rings 33 and 34 are interchangeable and either may be threaded upon each end of casing 19.

Gimbal 11 is suitably mounted within housing 18 for pivotal movement therein about its vertical axis. As shown best in Figure 3 this mounting is provided by the axially spaced bearing assemblies 37 and 38. Bearing assembly 37 is suitably securely mounted upon the annular cover plate 21 and comprises a disc portion 41 from which extends integral cylindrical projection or spindle 42. The longitudinal axis of this spindle 42 is coaxially aligned with the axis of housing 18. A suitable ball bearing assembly 43 is adapted to fit upon stem 42.

The bearing assembly 38 is affixed to base member 22 and comprises, as best shown in Figures 3 and 6, two segment elements 44 and 45 integrally formed on base member 22 with their flat base portions spaced from and in parallel relationship to one another so as to define therebetween a slot or passage, indicated generally by the numeral 46. A cap member 47 is mounted upon and over the segments 44 and 45 and bridges the slot 46. A plurality of screws 48 rigidly secure the cap member 47 assembled upon the base member 22. These screws 48 are passed through the cap 47 and segments 44 and 45 to project to the exterior of base member 22 where suitable elastic sealing rings (not shown) and elastic stop nuts 51 are fitted onto the projecting stud portions to seal effectively the stud openings in the base member 22.

Cap member 47 has a downwardly extending flange 52 which is adapted to embrace the segments 44 and 45 confining them to prevent any outward lateral separating movement of such segments. Integral with the upper surface of cap member 47 is an upwardly extending spindle means 53, the axis of which coincides with the axis of housing 18 to place it in coaxial alignment with spindle 42 on cover plate 21. A ball bearing assembly 54 is adapted to be supported on spindle 53.

Generally rectangular gimbal frame 11 includes spaced horizontal or transverse arms 55 and 56 interconnecting the opposite ends of upwardly extending arms 13 and 14 and paralleling the spin axis of gyro rotor 12. Centrally of each of the transverse arms 55 and 56 is provided an annular recess 57, which recesses 57 are to accommodate the ball bearing assemblies 43 and 54 and receive the opposed spindles 42 and 53, and thereby effect the pivotal mounting of gimbal frame 11.

Secured to upper transverse arm 55 is a suitable weight 60 for effecting proper balance of the assembled gimbal frame 11 and gyro rotor 12.

Rotatably supporting gimbal frame 11 at its opposite ends by means of the spaced bearing assemblies 37 and 38, fixedly and accurately located in cover plate 21 and base member 22, assures that the gimbal frame 11 is accurately positioned and aligned and further restrains the gimbal frame 11 against any tipping action within the casing 18.

With the design provided for the present invention there is no requirement that the gimbal frame 11 be adjusted lengthwise or in axial direction and therefore a possibility of maladjustment of the gimbal within housing 18 is avoided. To avoid the necessity for lengthwise adjustment of gimbal frame 11 the annular shoulders 23 and 24 cut into the ends of casing 19 are held to close tolerances. The cover plate 21 and the base member 22, associated with shoulders 23 and 24, will then be located in accurately spaced relationship to present the bearing assemblies 37 and 38 in proper mounting position. Discrepancy in the height of the gimbal frame 11 is suitably cared for by providing shims 61 on spindle 42.

Free rotation of gimbal frame 11 about its vertical axis is yieldably restrained by a resilient means 62 located between the gimbal lower transverse arm 56 and the base member 22. Resilient means 62 comprises an elongated, generally rectangular, resilient flat member 63 formed of a suitable material such as spring steel. Flat spring member 63 extends through passage 46 parallel to lower transverse arm 56 of gimbal 11 and lies disposed within housing 18 with a longitudinal edge thereof down, but with this edge spaced a slight distance above the upper surface of base member 22. To support and maintain the flat spring member 63 in desired position within slot 46 and spaced above the surfaces of the base member 22 there is provided a pair of clamping blocks 64 and 65 which are adapted to fit within slot 46 and to engage with the central portion of flat spring member 63 at the flat faces thereof which provides free portions of the flat spring member 63 disposed on each side of the clamping support. Set screws 66 threaded through segment 44 apply the required clamping force for holding the clamping blocks 64 and 65 and the flat spring member 63 rigidly assembled and supported within slot 46. It is noted that flat spring member 63 is located perpendicular to the vertical axis of gimbal 11. Further, the construction just described locates the flat spring member 63 so that it passes substantially through the center line of bearing assembly 38 which is important to obtaining deflections of the gimbal frame 11 proportional to the imposed rate.

Affixed to gimbal frame 11 at the lower end of upwardly extending arm 13 and projecting downwardly therefrom is a pin member 67 which is adapted to abut against the flat vertical face 68 of spring member 63 at end 69 thereof. However, even though pin 67 and face 68 of flat spring 63 are in touching engagement neither normally exerts pressure upon the other. Fastened upon opposite upwardly extending arm 14 of gimbal frame 11 is a bracket member 71, which projects below the gimbal to lie on the same side of flat spring member 63 as does fixed pin member 67. An adjusting screw 72 threaded through and carried by bracket member 71 extends therefrom to abut flat face 68 at end 73 of spring member 63. Again there is no pressure exerted by or upon either of the touching members. Screw 72 being adjustable is readily moved into proper relationship with flat spring member 63. A set screw 74 threaded into bracket 71 acts to lock adjusting screw 72 in the desired position.

The construction just above described provides a resilient restraining means for the gimbal 11 which comes into operation when the gimbal 11 is made to rotate upon its vertical axis due to the movements of the apparatus with which the gyroscope is associated. Fixed pin 67 acting against end 69 of flat spring member 63 restrains the gimbal 11 against free rotation, about its vertical axis, in one direction, and adjusting screw 72 acting upon end 73 of flat spring member 63 restrains free rotational movement of gimbal 11 in the opposite direction.

It is to be noted that neither end of the flat spring member 63 is required to withstand reversing stresses, as each end will always have pressure applied thereto from one side only, and flexing of each end of the spring member 63 is always in the same direction. Applying pressure to the spring member 63 in the manner described is desirable because the condition of hysteresis is avoided. The spring member 63 will therefore retain its original effectiveness and continuously operate in required accurate fashion.

The extent of pivotal movement available to gimbal frame 11 is determined, as best shown in Figure 2, by spaced stops 75 and 76, which stops are disposed one on each side of gimbal 11 and are secured to the base member 22 by studs 77 carrying resilient annular sealing member (not shown) and elastic stop nuts 78 at the portions thereof exterior of the base member 22. Stop 75 assumes, in general, the shape of a disc, and is engageable by the lower end of bracket 71 when gimbal frame 11 rotates in the direction of the stop to prevent further movement therepast. Stop 76 is in the form of a cylinder and is of a height sufficient to permit it to engage the gimbal frame 11 as it swings in its direction to stop further movement.

A position sensing means 81 is provided within housing 18 for cooperative association with gimbal frame 11 and comprises a potentiometer including a closely wound fine resistance wire 82 suitably supported on an arcuate insulating member 83, which arcuate member assumes the shape of a true arc whose center coincides with that of the gimbal axis and is mounted on base 22 adjacent the free end 69 of the flat spring 63. Screws 84 secure insulating member 83 to base 22. Angular adjustment of insulating member 83 about the center of base member 22 is permitted by providing conventional slotted openings 85 in insulating member 83 for accommodating the shanks of screws 84, the heads of screws 84 being tightened down upon ledge portions when the desired angular adjustment is attained. Providing for angular adjustment permits the zero position of the resistance wire 82 to be accurately located relative to a flexible electrical contact arm 86 carried by the gimbal frame 11 and extending therefrom to engage the resistance wire 82 for sliding movement thereon. Contact arm 86 extends from the support afforded by gimbal frame 11 and is of a construction that it will normally rest upon only a single turn of the resistance wire 82. When the gyroscope is at rest the contact arm 86 is adapted to engage that single turn which has been determined to be the neutral or zero position of the potentiometer.

An arcuate terminal block 87 formed of insulating material is affixed to base member 22 upon the exterior surface thereof and is adapted to have electrical connections from an external circuit secured thereto.

Block 87 is provided with five through passages 88, counter-bored at one end as at 89. Five connector assemblies 90, 91, 92, 93 and 94 are also provided, each associated with a passage 88. Each connector assembly includes a conductor element 95 having a shank 96 which is disposed in passage 88 and extends through an aligned counter-bored opening 97 provided in base members 22 to project into the housing 18. An integral lug 98 is formed on conductor element 95 at the outer end thereof and is adapted to be fitted into a slot 99 into block 87 and in communication with counter-bore 89. This construction serves to lock the conductor element 95 against rotation within its passage 88. The conductor elements 95 of each of the connector assemblies 90, 91, 92, 93 and 94 project into housing 18 and all are locked against rotation in the manner described. Upon the projecting portions of the conductor elements 95 of four of these assemblies 90, 92, 93 and 94 are fitted insulating bushings 100. Connector assembly 91, instead of accommodating an insulating bushing 100, supports a metallic disc 101 suitable for grounding conductor element 95 to the base member 22. Figure 4 is illustrative of the construction intended for the four assemblies 90, 92, 93 and 94. Assembly 91 is exactly similar excepting for the substitution of metallic disc 101 for the insulating bushing 100.

Referring again to Figure 4, it is seen that the insulating bushings 100 comprise a cylindrical body portion 102 having a counter-bored opening 103 therethrough. Each insulating bushing 100 is adapted to rest within counter-bored opening 97 in base member 22 and receive the projecting shank 96 of its associated conductor element 95. Shank 96 has fitted thereon an annular resilient sealing member 104 which rests in counter-bored opening 97 between the insulating bushing 100 and the terminal block 87. The interior end of conductor shank 96 is tapped to receive terminal screw 105. Tightening of terminal screw 105 in addition to securing an electrical lead to the shank 96 serves to mount terminal block 87 to base member 22 and results in a compression of sealing member 104 between the insulating bushing 100 and the terminal block 87. The resulting lateral expansion of ring 104 seals shank 96 in base member 22. It is to be noted that member 104 further acts as a connecting link between terminal block 87 and bushing 100 to provide continuous insulation of the terminal from end to end.

For attachment of an outside electrical lead to the conductor element 95 there is provided a terminal screw 106 adapted to be threaded into tapped opening in external end 107 of conductor element 95.

An insulating cover 108 having the same general shape as terminal block 87 is adapted to be mounted thereon to cover the open ends of passages 88 for protection of the terminals therein.

Within housing 18 and mounted on base member 22 are an induction coil 110 and a condenser 111 having electrical association with one another and with the gyro rotor 12, and with one end of condenser 111 being grounded to the base 22 by connecting a convenient lead to screw 77 which holds stop 75 to the base. This assembly is provided to serve, in well known manner, as a radio noise suppressor for the gyroscope.

Figure 9 illustrates the electrical circuit for the gyroscope of the present invention. As shown gyro rotor 12 is connected by lead 17 to induction coil 110 which in turn is connected by lead 112 to connector assembly 90 on terminal block 87. Assembly 90 serves as the point to which electrical power from a suitable external source (not shown) may be fed. An electrical lead 113 serves to connect gyro rotor 12 to grounded connector assembly 91. As illustrated capacitor 111 is connected in shunt between leads 17 and 113.

The opposite ends of the potentiometer resistance winding 82 are secured by electric leads 114 and 115 respectively to connector assemblies 92 and 94. Contact arm 86, slidably operative on potentiometer resistance 82, is connected by a lead 116 to connector assembly 93.

Having reference now to Figure 6 it is noted that cuts or grooves 118 are provided in base member 22. These cuts 118 serve as passages for connecting wires 112 and 114 led from induction coil 110 and resistance winding 82 and provide convenient means of leading wires 112 and 114 under the flat spring member 63 without hindering the free movement thereof.

On the exterior surface of base member 22 is secured a plate 121 upon which are provided markings indicated generally by numeral 122, which serve to indicate the direction of the spin axis of gyro rotor 12 within housing 18, and markings, indicated generally by numeral 123, which locates the direction of the vertical axis of the gimbal frame 11. This marking plate 121 provides a convenient means for insuring that the gyroscopic device of the present invention will be properly located on the apparatus it is required to serve.

With the connection of the present invention into any suitable external indicating circuit (not shown) power will be supplied to the gyro rotor 12 for energization and operation thereof. The rate of displacement of the gyro rotor 12 about an axis perpendicular to the spin axis of the gyro rotor 12 and to the gimbal axis, induced by the movement of the apparatus being served, will be indicated through movement of contact arm 86 on winding 82, contact arm 86 moving each time gimbal frame 11 deflects. The rate of displacement of the gyro rotor 12 is proportional to the deflection of the gimbal 11 so that the signal provided is a linear indication of the action of the gyroscope, this signal will have an accuracy which renders the device satisfactory for use. Characteristics other than a linear response may be achieved by specially shaped springs but since in most cases the result desired is an indication directly proportional to the rate of turn or rotation of the apparatus, such as an aircraft being stabilized, a flat spring member 63, as shown and described, is preferred.

Attention is directed to a desirable feature of the present invention, which feature is the use of a construction resulting in a hermetically sealed gyroscopic instrument having the operating parts located so as not to be subjected to corroding influences or foreign matter. A hermetically sealed device is obtained by utilizing close fitting parts and compressible resilient sealing means at each of the various openings to the housing 18. The cover plate 21 and the base member 22 support annular sealing members 27 which are compressed against the interior wall surface of casing 19 to seal the ends thereof. The various connector assemblies 90, 91, 92, 93 and 94 all include annular sealing members 104 which seal the openings 97 in base member 22. The various screws provided for holding the cap 47, stops 75 and 76, the potentiometer insulating base 83 and the induction coil 110 to the base member 22 all have, as has been described, suitable annular sealing rings (not shown) and elastic stop nuts applied to their exteriorly projecting ends which act to seal all stud openings through base member 22 and prevent ingress to the housing 18, or egress at high altitude.

As is apparent from the description herein given of the invention the removable base member 22 acts to support all of the various elements of the gyroscope, the cover plate 21 serving only to mount a bearing assembly 37 for the upper part of gimbal frame 11. With such an arrangement it is possible to assemble the various working parts in very accurate relationship to one another. This arrangement also permits the use of a housing 18 which can be made to the smallest possible dimension. The housing 18 affords an accurate, unchanging support for holding the bearing spindles 42 and 53 in alignment.

The novel resilient restraining spring assembly for the gimbal frame 11 utilizing a single flat spring 63 permits maximum length of spring in a minimum size housing. Only a single support is required for the spring, which support acts to clamp the flat spring solidly at its central portion so that its free ends act as separate cantilever springs. The use of a single spring makes it possible to obtain uniform rate indication in either direction of movement of gimbal frame 11.

While certain preferred embodiments of the invention have been specifically disclosed it is understood that the invention is not limited thereto as many variations will be readily apparent to those skilled in the art and the invention is to be given its broadest possible interpretation within the terms of the following claims.

I claim:
1. In a gyroscopic instrument a base member, a gimbal, means pivotally supporting said gimbal on said base member, a gyro-rotor mounted in said gimbal for spinning about an axis perpendicular to the pivotal axis of the gimbal, resilient means for yieldably restraining said pivotally supported gimbal against movement from its neutral position, said means comprising an elongated flat spring member, means for mounting said flat spring member on said base member and adjacent said gimbal, said mounting means supporting said flat spring member at substantially the central portion thereof to provide free portions extending on each side of the mounting means, means provided by said gimbal extending toward said flat spring member for engagement therewith on each side of its mounting means for flexing the free portions of the flat spring member on movement of said gimbal, and position sensing means operatively associated with said gimbal whereby pivotal movement of said gimbal from its neutral position is detected.

2. In a gyroscopic instrument, a hermetically sealed housing comprising an open-ended cylindrical casing, an annular cover member having an annular resilient sealing member mounted on its periphery for sealing one end of said casing, and an annular base member also having an annular resilient sealing member mounted on its periphery for sealing the opposite end of the casing, a pivotally mounted gimbal supported between said cover member and said base member, a gyro rotor rotatably mounted in said gimbal, resilient means for yieldably restraining said pivotally mounted gimbal against movement from its neutral position, support means for said resilient means for locating it adjacent said gimbal, means for effecting an operative connection between said gimbal and said resilient means, position sensing means operatively associated with said gimbal whereby pivotal movement of said gimbal from its neutral position is detected, a terminal block mounted on the exterior of said base member, an electrical conductor member extending through an opening in the terminal block and an aligned opening in said base member to project into the interior of the housing, an insulating bushing disposed on the projecting portion of said conductor member, and a sealing member closing said opening in the base member, and cooperating with said terminal block and said insulating bushing to insulate said conductor member throughout its length.

3. In a gyroscopic instrument, a base member, a gimbal, means pivotally supporting said gimbal on said base member for movement about an axis perpendicular to said base member, a gyro-rotor mounted in said gimbal for spinning about an axis perpendicular to the pivotal axis of the gimbal, resilient means for yieldably restraining said pivotally supported gimbal against movement from its neutral position, said means comprising an elongated flat spring member positioned adjacent the gimbal, a pair of projecting spaced means provided by said gimbal extending therefrom for operative engagement with said flat spring member for flexing the opposite ends thereof on pivotal movement of the gimbal in opposite direction about its axis, and position sensing means operatively associated with said gimbal whereby pivotal movement of said gimbal from its neutral position is detected.

4. In a gyroscopic instrument, a base member, a gimbal frame, means on said base member pivotally supporting said gimbal frame for movement about an axis perpendicular to said base member, a gyro-rotor mounted on said gimbal frame for spinning movement about an axis perpendicular to the axis of said gimbal frame, resilient means for yieldably restraining said gimbal frame against pivotal movement from its neutral position, said resilient means comprising an integral elongated flat spring member, means on said base member for supporting said flat spring member between said base member and said gimbal frame, said supporting means mounting said flat spring member substantially at the central portion thereof, a pair of projecting members on said gimbal frame, spaced from one another and extending toward said flat spring member for engagement with the opposite ends thereof and with the same flat face of the spring member, whereby the opposite ends of the flat spring member will be separately flexed and in the same direction on pivotal movement of the gimbal frame in opposite directions about its axis, and position sensing means operatively associated with said gimbal frame whereby pivotal movement of said gimbal frame from its neutral position is detected.

5. In a gyroscopic instrument, a base member, a gimbal frame, means on said base member pivotally supporting said gimbal frame for movement about an axis perpendicular to said base member, a gyro-rotor comprising an enclosed electric motor, mounted on said gimbal frame for spinning movement about an axis perpendicular to the axis of said gimbal frame, resilient means for yieldably restraining said gimbal frame against pivotal movement from its neutral position, said resilient means comprising an integral elongated flat spring member, means on said base member for supporting said flat spring member between said base member and said gimbal frame, said supporting means mounting said flat spring member substantially at the central portion thereof, a pair of projecting members on said gimbal frame, spaced from one another and extending toward said flat spring member for engagement with the opposite ends thereof and with the same flat face of the spring member, whereby the opposite ends of the flat spring member will be separately flexed and in the same direction on pivotal movement of the gimbal frame in opposite directions about its axis, and position sensing means operatively associated with said gimbal frame whereby pivotal movement of said gimbal frame from its neutral position is detected, said position sensing means comprising a potentiometer having a resistance winding supported on said base member and a cooperating electrical contact arm therefor supported on said gimbal frame.

6. In a gyroscopic instrument, an enclosed housing comprising a cylindrical casing, a cover member for closing one end thereof and a base member for closing the opposite end, a gimbal frame disposed within the casing, a bearing assembly mounted on said cover member, a bearing assembly mounted on said base member in axial alignment with the first bearing assembly, said bearing assemblies cooperating to pivotally support said gimbal frame therebetween, a gyro-rotor mounted on said gimbal frame for spinning about an axis perpendicular to the pivotal axis of the gimbal frame, resilient means for yieldably restraining said gimbal frame against movement from its neutral position, said means comprising an elongated flat spring member, means for mounting said flat spring member on said base member and adjacent said gimbal frame, said mounting means supporting said flat spring member at substantially the central portion thereof to provide free portions extending on each side of the mounting means, means provided by said gimbal frame extending for engagement with the free portions of the flat spring member on each side of its mounting for flexing of these free portions of said flat spring member on pivotal movement of said gimbal frame, and position sensing means operatively associated with said gimbal frame whereby pivotal movement of said gimbal frame from its neutral position is detected.

7. In a gyroscopic instrument, an enclosed housing comprising a cylindrical open-ended casing, an annular cover member for closing one end thereof and an annular base member for closing the opposite end, a gimbal frame disposed within the casing, a bearing assembly mounted on said base member in axial alignment with the first bearing assembly, said bearing assemblies cooperating to support said gimbal frame therebetween for pivotal movement about an axis perpendicular to said base member, a gyro rotor mounted on said gimbal frame for spinning movement about an axis perpendicular to the axis of said gimbal frame, resilient means for yieldably restraining said gimbal frame against pivotal movement from its neutral position, said resilient means comprising an integral elongated flat spring member, means on said base member for supporting said flat spring member between said base member and said gimbal frame, said supporting means mounting said flat spring member substantially at the central portion thereof, a pair of projecting members on said gimbal frame, spaced from one another and extending toward said flat spring member for engagement with the opposite ends thereof and with the same flat face of the spring member, whereby the opposite ends of the flat spring member will be separately flexed and in the same direction on pivotal movement of the gimbal frame in opposite directions about its axis, and position sensing means operatively associated with said gimbal frame whereby pivotal movement of said gimbal frame from its neutral position is detected.

8. In a gyroscopic instrument, an enclosed housing comprising a cylindrical open-ended casing, an annular cover member for closing one end thereof and an annular base member for closing the opposite end, a gimbal frame disposed within the casing, a bearing assembly comprising a projecting spindle means, mounted on said cover member, a bearing assembly comprising a projecting spindle means, mounted on said base member, which latter spindle means is in axial alignment with the spindle means of the first bearing assembly, said bearing assemblies cooperating to support said gimbal frame therebetween for pivotal movement about an axis perpendicular to said base member, a gyro rotor mounted on said gimbal frame for spinning movement about an axis perpendicular to the axis of said gimbal frame, resilient means for yieldably restraining said gimbal frame against pivotal movement from its neutral position, said resilient means comprising an integral elongated flat spring member, means on said base member for supporting said flat spring member between said base member and said gimbal frame, said supporting means mounting said flat spring member substantially at the central portion thereof, a pair of projecting members on said gimbal frame, spaced from one another and extending toward said flat spring member for engagement with the opposite ends thereof and with the same flat face of the spring member, whereby the opposite ends of the flat spring member will be separately flexed and in the same direction on pivotal movement of the gimbal frame in opposite directions about its axis, and position sensing means operatively associated with said gimbal frame whereby pivotal movement of said gimbal frame from its neutral position is detected, said position sensing means comprising a potentiometer having a resistance winding supported on said base member and a cooperating electrical contact arm therefor supported on said gimbal frame.

9. In a gyroscopic instrument, an enclosed housing comprising a cylindrical casing, a cover member for closing one end thereof and a base member for closing the opposite end, a gimbal frame disposed within the casing, a bearing assembly mounted on said cover member, a bearing assembly mounted on said base member in axial alignment with the first bearing assembly, said bearing assemblies cooperating to pivotally support said gimbal frame therebetween, a gyro rotor mounted on said gimbal frame for spinning about an axis perpendicular to the pivotal axis of the gimbal frame, resilient means for yieldably restraining said gimbal frame against movement from its neutral position, said means comprising an elongated flat spring member, said bearing assembly mounted on said base member having a passage provided therethrough, clamping means located within said passage for mounting said flat spring member between said gimbal frame and said base member, said clamping means supporting said flat spring member at substantially the central portion thereof to provide free portions extending on each side of the bearing assembly on the base member, means provided by said gimbal frame extending for engagement with said flat spring member, engaging the free portions thereof on each side of its mounting for flexing of these free portions of the flat spring member on pivotal movement of said gimbal frame, and position sensing means operatively associated with said gimbal frame whereby pivotal movement of said gimbal frame from its neutral position is detected.

10. In a gyroscopic instrument, a hermetically sealed housing comprising an open-ended cylindrical casing, an annular cover member having an annular resilient member mounted on its periphery for sealing one end of said casing, and an annular base member also having an annular resilient sealing member mounted on its periphery for sealing the opposite end of the casing, a gimbal frame disposed within the casing, a bearing assembly mounted on said cover member, a bearing assembly mounted on said base member in axial alignment with the first bearing assembly, said bearing assemblies cooperating to pivotally support said gimbal frame therebetween, a gyro rotor mounted on said gimbal frame for spinning about an axis perpendicular to the pivotal axis of the gimbal frame, resilient means for yieldably restraining said gimbal frame against movement from its neutral position, said means comprising an elongated flat spring member, means for mounting said flat spring member on said base member and adjacent said gimbal frame, said mounting means supporting said flat spring member at substantially the central portion thereof to provide free portions extending on each side of the mounting means, means provided by said gimbal frame extending for engagement with said flat spring member, engaging the free portions thereof on each side of its mounting for flexing of these free portions of the flat spring member on pivotal movement of said gimbal frame, and position sensing means operatively associated with said gimbal frame whereby pivotal movement of said gimbal frame from its neutral position is detected.

11. In a gyroscopic instrument, a hermetically sealed housing comprising an open-ended cylindrical casing, an annular cover member having an annular resilient sealing member mounted in its periphery for sealing one end of said casing, and an annular base member also having an annular resilient sealing member on its periphery for sealing the opposite end of the casing, a gimbal frame disposed within the casing, a bearing assembly mounted on said cover member, a bearing assembly mounted on said base member in axial alignment with the first bearing assembly, said bearing assemblies cooperating to support said gimbal frame therebetween for pivotal movement about an axis perpendicular to said base member, a gyro-rotor mounted on said gimbal frame for spinning movement about an axis perpendicular to the axis of said gimbal frame, resilient means for yieldably restraining said gimbal frame against pivotal movement from its neutral position, said resilient means comprising an integral elongated flat spring member, means on said base member for supporting said flat spring member between said base member and said gimbal frame, said supporting means mounting said flat spring member substantially at the central portion thereof, a pair of projecting members on said gimbal frame, spaced from one another and extending toward said flat spring member for engagement with the opposite ends thereof and with the same flat face of the spring member, whereby the opposite ends of the flat spring member will be separately flexed and in the same direction on pivotal movement of the gimbal frame in opposite directions about its axis, and position sensing means operatively associated with said gimbal frame whereby pivotal movement of said gimbal frame from its neutral position is detected.

12. In a gyroscopic instrument, a hermetically sealed housing comprising an open-ended cylindrical casing, an annular cover member having an annular resilient sealing member mounted in its periphery for sealing one end of said casing, and an annular base member also having an annular resilient sealing member on its periphery for sealing the opposite end of the casing, spaced annular shoulders formed at each end of said casing engageable by said cover member and said base member for locating said members relative to one another, a gimbal frame disposed within the casing, a first bearing assembly comprising a projecting spindle means, mounted on said cover member, a second bearing assembly comprising a projecting spindle means, mounted on said base member, which latter spindle means is in axial alignment with the spindle means of said first bearing assembly, said bearing assemblies cooperating to support said gimbal frame therebetween for pivotal movement about an axis perpendicular to said base member, a gyro-rotor comprising an electric motor mounted on said gimbal frame for spinning movement about an axis perpendicular to the axis of said gimbal frame, resilient means for yieldably restraining said gimbal frame against pivotal movement from its neutral position, said means comprising an elongated flat spring member, said bearing assembly mounted on said base member having a passage provided therethrough, clamping means located within said passage for mounting said flat spring member between said gimbal frame and said base member, said clamping means supporting said flat spring member at substantially the central portion thereof to provide free portions extending on each side of the bearing assembly on the base member, a pair of projecting members on said gimbal frame, spaced from one another and extending toward said flat spring member for engagement with the opposite ends thereof and with the same flat face of the spring member, whereby the opposite ends of the flat spring member will be separately flexed and in the same direction on pivotal movement of the gimbal frame in opposite directions about its axis, and position sensing means operatively associated with said gimbal frame whereby pivotal movement of said gimbal frame from its neutral position is detected, said position sensing means comprising a potentiometer having a resistance winding supported on said base member and a co-operating electrical contact arm therefor supported on said gimbal frame.

13. In a gyroscopic instrument, an enclosed housing comprising a cover member, a base member, a gimbal, means pivotally supporting said gimbal on said base member for movement about an axis perpendicular thereto, a gyro-rotor mounted in said gimbal for spinning about an axis perpendicular to the pivotal axis of the gimbal, resilient means for yieldably restraining said pivotally supported gimbal against movement from its neutral position, said means comprising an elongated flat spring member positioned adjacent the gimbal, means provided by said gimbal extending in the direction of the flat spring member and adapted to engage said flat spring member for flexing thereof on movement of said gimbal, position sensing means operatively associated with said gimbal whereby pivotal movement of said gimbal from its neutral position is detected, and means provided on the exterior of said base member for indicating the direction of the spin axis of gyro-rotor and the location of the pivotal axis of said gimbal frame.

14. In a gyroscopic instrument, a hermetically sealed housing comprising an open-ended cylindrical casing, an annular cover member having an annular resilient sealing member mounted on its periphery for sealing one end of said casing, and an annular base member also having an annular resilient sealing member mounted on its periphery for sealing the opposite end of the casing, a gimbal, means for pivotally mounting said gimbal for pivotal movement about an axis perpendicular to said base member, a gyro-rotor mounted in said gimbal for spinning about an axis perpendicular to the pivotal axis of the gimbal, resilient means for yieldably restraining said pivotally supported gimbal against movement from its neutral position, said means comprising an elongated flat spring member positioned adjacent the gimbal, means provided by said gimbal extending in the direction of the flat spring member and adapted to engage said flat spring member for flexing thereof on movement of said gimbal, position sensing means operatively associated with said gimbal whereby pivotal movement of said gimbal from its neutral position is detected, and means provided on the exterior of said base member for indicating the direction of the spin axis of gyro-rotor and the location of the pivotal axis of said gimbal frame.

JAMES P. WATSON.

REFERENCES CITED

The following references are of record in the file of this patent:

UNITED STATES PATENTS

| Number | Name | Date |
|---|---|---|
| 2,078,734 | Schilovsky | Apr. 27, 1937 |
| 2,199,290 | Moss | Apr. 30, 1940 |
| 2,351,629 | Noxon | June 20, 1944 |
| 2,365,439 | Schulze | Dec. 19, 1944 |